June 7, 1949.  J. W. PAYNE  2,472,776
METHOD OF HEAT-TREATING PARTICLE-FORM SOLID ADSORBENTS
Filed March 4, 1947
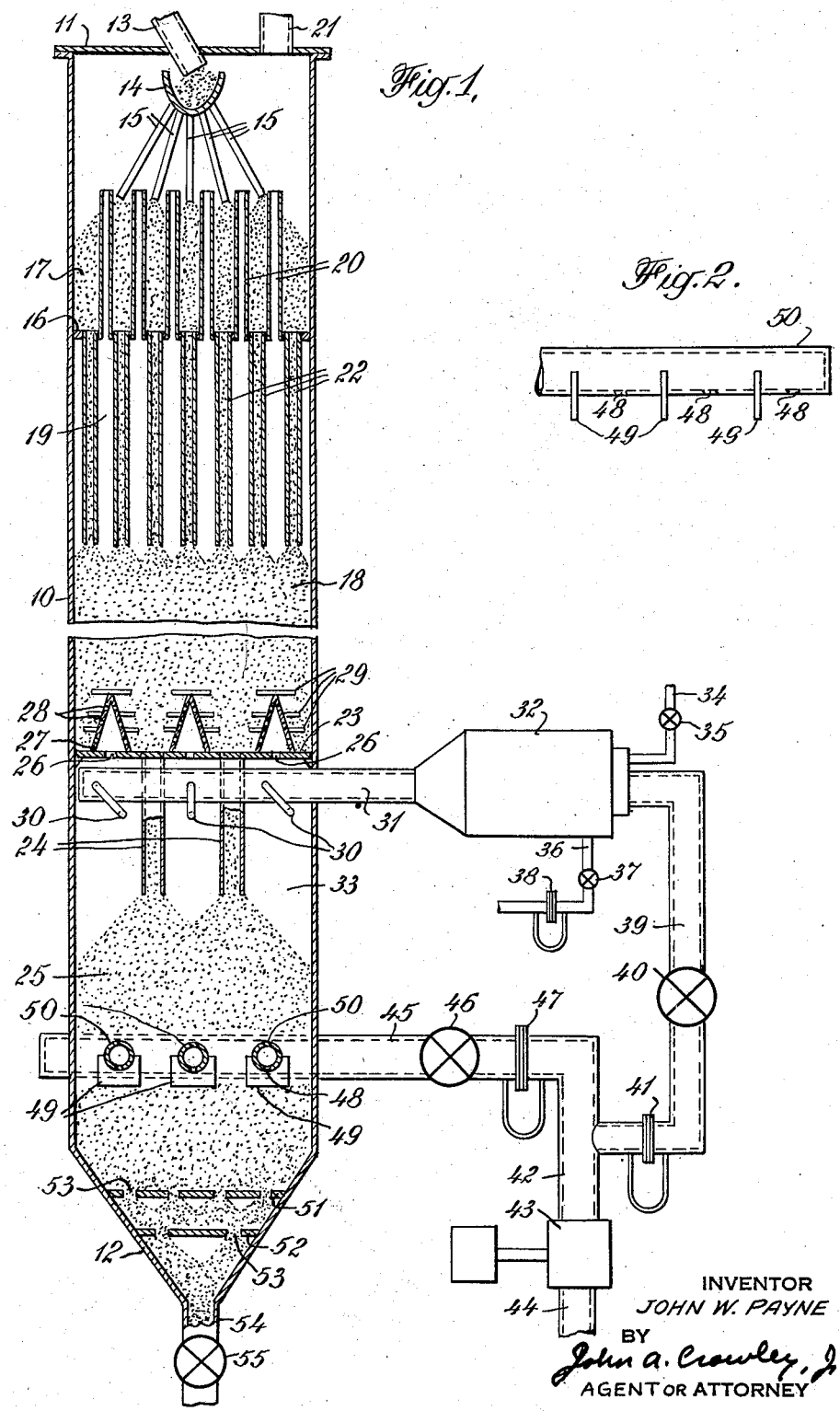
INVENTOR
JOHN W. PAYNE
BY
John A. Crowley, Jr.
AGENT OR ATTORNEY Patented June 7, 1949

2,472,776

UNITED STATES PATENT OFFICE 2,472,776

METHOD OF HEAT-TREATING PARTICLE-FORM SOLID ADSORBENTS

John W. Payne, Woodbury, N. J., assignor to Socony-Vacuum Oil Company, Incorporated, a corporation of New York Application March 4, 1947, Serial No. 732,304

16 Claims. (Cl. 252—410)

This application is a continuation in part of application Serial Number 571,308, filed in the United States Patent Office January 4, 1945, now abandoned.

This invention has to do with a method and apparatus for heat treating particle form solid adsorbent materials which may be by nature useful for a variety of purposes and particularly for heat treating particle form solid adsorbent materials of the type used for adsorption and catalytic conversion and treating operations. Typical of such catalytic conversion operations is the catalytic cracking conversion of hydrocarbons, it being well known that hydrocarbon gas oils boiling within the approximate range of 450° F. to 750° F. may be converted to gasoline and other products when contacted with certain solid adsorbent materials at temperatures of the order of 800° F. and higher and pressures generally above atmospheric. Carbonaceous contaminants may be deposited upon the absorbent material during the hydrocarbon conversion causing a gradual decline in the catalytic activity of the solid material and requiring periodic regeneration thereof. Such regeneration is generally accomplished by subjecting the solid material to the action of a combustion supporting gas acting to burn off the contaminant therefrom and thereby heating the solid material to temperatures of the order of 900° F. to 1300° F.

The particle form solid adsorbent materials used for such processes may partake of the nature of natural and treated clays or of certain synthetic associations of silica, alumina, or silica and alumina to which other constituents may be added such as certain metallic oxides. An important material of the latter type is the recently developed spherical shaped, gel type "bead catalyst."

Before the use of freshly prepared solid adsorbent materials for such processes as the above, it has been found necessary to subject them to a heat treatment. Such heat treatment serves several purposes, first, it hardens the solid material particles so as to render them less susceptible to crushing and breakage in use. Second, it stabilizes the catalytic activity of the solid material as regards the hydrocarbon conversion reaction and the amount of contaminant deposition resulting therefrom. Third, it renders the solid material less susceptible to drop in catalytic activity due to the high temperatures involved in the regeneration operation. Such heat treatment now involves maintaining the freshly prepared, dried particle form solid material at temperatures of the order of 1000° F. to 1600° F. generally in the presence of controlled partial pressures of steam for definite periods of time. Certain types of particle form solid adsorbents such as the gel type spherical bead catalyst tend to undergo considerable particle size degradation by cracking or bursting of the solid particle if the particles contain large amounts of moisture and are subjected to rapid changes in temperature. Heretofore all attempts to heat treat such materials on a practical commercial scale have failed due to cracking or breakage of most of the solid particles. It was found that most of the particle cracking and breakage occurs during the preheating period at those temperature levels, generally within the range 300° F. to 700° F. when the last 10% to 15% moisture is removed from the solid particles. It was discovered that the cracking and breakage could be substantially eliminated by very delicate control of the rate of solid preheating during this stage of the solid preheat. This invention is specifically directed to a method for heat treating such easily cracked solid material particles which method involves proper control of the rate and amount of preheat during this critical stage of the solid heating. In its broader aspects the invention is directed to a method and apparatus which may be conveniently used for heat treating any type of particle form solid adsorbent material.

A major object of this invention is the provision of a method for heating to elevated temperatures moisture containing particle form adsorbents susceptible to breakage and cracking upon heating which method avoids substantial breakage and cracking of the adsorbent particles.

A specific object is the provision of an improved process for heat treating particle form gel type adsorbents.

Another important object is the provision of a method for heat treating "bead catalyst."

These and other objects of this invention will become apparent from the following discussion.

The invention may be more readily understood by reference to the attached drawings of which Figure 1 is an elevational view, partially in section, of a preferred form of the apparatus for conducting solid heat treating operations and Figure 2 shows a section in detail of one of the gas distributors used in said apparatus. Both of these drawings are highly diagrammatic in form.

In Figure 1, 10 represents the shell of a vertical vessel closed on its upper end by plate 11 and on its lower end by converging section 12. The vessel may be of any desired cross-sectional shape, although circular or rectangular cross-section are preferred. The vessel may be left open at its upper end if escape of the heat treating gas directly to the atmosphere is unobjectionable. A conduit 13 is provided at the upper end of vessel 10 for inlet of untreated solid material. The solid material is fed into a trough 14, supported by members (not shown) from which trough several distributor pipes 15 depend for uniform distribution of solid material across the vessel cross section. Constructions other than that shown may be substituted for solid material distributors, if desired. A partition 16 is supported across the upper section of the vessel to provide a surge chamber 17. A plurality of conduits 22 depend from partition 16 and terminate a fixed distance therebelow for flow of solid material to the heat treating zone 18 of the vessel and a plurality of conduits 20 are connected through the partition 16 and extend upwardly therefrom to a level above that of the lower ends of distributor pipes 15. The conduits 22 are so spaced as to provide a gas space 19 therebetween for gas flow. A gas outlet duct 21 is provided in the top plate 11 of the vessel. The arrangement described provides an effective indirect heat transfer type of solid preheater within the upper section of the vessel. A second partition 23 is provided across the lower section of the vessel a substantial distance above the bottom thereof. A plurality of spaced rows of conduits 24 depend from said partition for flow of solid from the heat treating zone 18 to the cooling zone 25, thereby providing gas mixing chamber 33 between said zones. A plurality of spaced rows of holes 26 are provided through the partition 23 between said rows of conduits 24. Inverted angle shaped troughs 27 extend across the vessel in a direction perpendicular to the plane of the drawing so as to cover the rows of holes 26. A plurality of holes 28 are provided through the sides of these troughs to permit gas passage into the heat treating zone, and horizontally extending fins 29 are attached along the lengths of the troughs 27 to deflect the solid material flow away from the holes 28. A gas inlet manifold 31 extends into chamber 33 and a plurality of distributor pipes are attached to manifold 31 inside chamber 33 for gas introduction in such a way as to permit thorough mixing with gas rising to said chamber from cooling zone 25 therebelow. The gas inlet manifold 31 in turn connects into an externally located line type gas heater 32. Fuel inlet pipe 34 having control valve 35 thereon, and a steam inlet pipe 36 having control valve 37 and flow meter 38 thereon connect into the heater 32. A gas conduit 39 having flow control valve 40 and flow meter 41 thereon also connects into the heater and connects on its other end through conduit 42 to a gas compressor or blower 43. A conduit 44 is connected to the suction side of the blower or compressor 43. A gas inlet manifold 45 having flow control valve 46 and flow indicator 47 thereon also connects through pipe 42 to the blower or compressor 43. Gas distributor pipes 50 extend from the manifold 45 into and across the lower section of vessel 10 near the lower end of the cooling zone 25. These pipes are closed on their far ends and have holes 48 through their undersides at spaced intervals for gas distribution. Baffle plates 49 depend from the lower sections of the pipes at intervals between said holes. These plates extend a sufficient distance below the pipes to effectively block the gas space naturally formed during solid material flow which gas space extends along the underside of the pipes 50. The construction is clearly shown in Figure 2, wherein is shown a section of one of the pipes 50 near its closed end, the holes 48 in the underside thereof and the baffle plates 49. It will be understood that particular manifolding of the pipes 50 and of the inlet pipes 30 to gas chamber 33 is highly diagrammatic in form as is also the external gas manifolding and the method for heating the gas, and that certain structural improvements which will readily suggest themselves to those skilled in the art are considereed as included within the scope of this invention. Partitions 51 and 52 spaced vertically apart are supported across the converging drain section 12 of the vessel. Orifices 53 through the partitions are suitably distributed so as to cause the division of solid material flow into a plurality of streams proportionately distributed with respect to the vessel cross-section, which streams are then gradually and proportionately recombined into a single discharge stream, discharging through outlet conduit 54 connected to the lower end of section 12. The partition and orifice arrangement thus serves to provide uniform withdrawal of solid material from the entire cross-section of the column thereof within the vessel. Any other construction properly designed to serve the same purpose may be alternately substituted for the arrangement shown.

In an exemplary operation, untreated particle form solid adsorbent material at a temperature with the range atmospheric to about 400° F. is introduced through conduit 13 into the upper end of the treating vessel 10. The solid material is distributed from trough 14 through pipes 15 uniformly over the surface of the bed of said material in the surge zone 17. It is subjected to preheating within said surge zone by indirect contact with the partially cooled heat treating gas passing upwardly through conduits 20. It then passes downwardly through conduits 22 while being further heated by indirect heat exchange with the hot heat treating gas passing upwardly through the gas space 19. The number and length of the conduits 22 and 20 are such as to provide a predetermined amount of preheating at a relatively slow rate to a temperature sufficiently high to insure substantially complete removal of moisture from the solid material. The solid material then passes downwardly as a substantially compact column through the heat treating zone 10, in a short upper section of which it is rapidly heated to about the predetermined heat treating temperature which is usually within the range 1000° F. to 1600° F. by direct contact with hot heat treating gas passing upwardly through the solid material column. It is maintained near said heat treating temperature throughout the major and remaining part of the heat treating zone also by contact with said gas flow. The solid material then passes through conduits 24 into the cooling zone 25 wherein it is cooled to a predetermined outlet temperature by direct contact with a relatively low temperature gas passing upwardly through zone 25. The cooled solid material then passes through the orifices in the flow distribution partitions 51 and 52 and is withdrawn through conduit 54. The rate of solid flow is controlled by valve 55 so as to maintain the passages for solid material flow within the vessel substantially filled and so as to control the residence period of the solid material within the heat treating zone.

A controlled amount of inert gas, such as air, at temperatures generally within the range atmospheric to about 300° F. passes from compressor or blower 43 through conduits 42 and 45 into the distributor pipes 50 from which it passes through holes 48 into the column of solid material. It then passes upwardly through the solid material in cooling zone 25, thereby cooling the solid material and being preheated itself. The gas eventually rises into the mixing chamber 33 wherein it is thoroughly mixed with a preheated gas, such as air, which is introduced through inlet pipes 30. The gas fed to the pipes 30 may be air from blower 43, which air passes through conduits 42 and 39 to preheater 32 and then into manifold 31. The air is generally heated to a temperature somewhat above the predetermined solid heat treating temperature, the inlet rate and temperature being controlled so as to substantially balance the net heat removal from the entire heat treating apparatus. The mixed hot gas then passes through holes 26 in partition 23 and is distributed by inverted troughs 27 uniformly across the cross-section of the solid column in the lower end of the heat treating zone 18. It then passes upwardly through the solid material in the heat treating zone, maintaining the solid material near the predetermined heat treating temperature throughout most of the zone and rapidly adjusting it to about said heat treating temperature in a short upper section of said zone 18. The hot gas then passes upwardly through the gas space 19 so as to slowly heat the entering solid material by indirect heat transfer through pipes 22 through the critical stage of the solid preheating operation. The gas then passes upwardly through conduits 20 still in indirect heat transfer relationship with the solid material and finally is withdrawn from the top of the vessel through conduit 21 at a temperature of the order of 300° F. to 400° F.

It will be noted that the conduits 20 serve the dual purpose of providing a means for uniform withdrawal of gas from the upper end of gas space 19 and of providing part of the surface for indirect heat transfer between gas and solid material. The above arrangement for preheating the solid material at a carefully controlled rate is a preferred form of the apparatus, but other less preferable arrangements may be substituted within the scope of this invention. Thus, for example, means may be provided for directly removing the gas from the upper end of zone 18 and the partition 16 and conduits 20 and 22 eliminated. Heat transfer tubes may then be provided within the upper section of the vessel, through which the hot gas from the heat treating zone or other heat transfer fluid may be passed to accomplish the controlled preheating operation.

In any case the amount of surface so provided for indirect heat transfer should be such as to provide a rate of solid preheat within the range of about 75° F. to 150° F. increase per hour and broadly below about 60° F. per minute and to permit preheating of said solid material to a temperature sufficiently high for substantially complete removal of moisture from the solid material. For synthetic gel catalysts such as bead catalyst, the solid material should be preheated to a temperature within the range 200° F. to 600° F. above its inlet temperature depending upon its inlet temperature. Thus the inlet temperature of the solid material to the heat treating zone should be of the order of 500° F. to 700° F. It should be understood that the expression "substantially complete removal of moisture" as used herein in describing and claiming this invention is intended to mean substantially complete removal of that loosely bound moisture on the solid material which upon heating of the solid material is released at a rate so high as to result in cracking or breaking of the solid particles. As pointed out hereinabove for gel catalysts this loosely bound moisture is substantially completely removed at temperatures of the order of 500–700° F. After substantially complete removal of this loosely bound moisture many adsorbents may still contain small amounts of strongly bound moisture, probably chemically bound, which may be released only on further increase in the adsorbent temperature and which is not released at a rate sufficiently great to cause substantial breaking or cracking of the solid particles.

The following Table I presents data on catalyst particle cracking and breakage occurring in heating a typical spherical silica alumina gel catalyst at various rates.

Table I

| Catalyst Temperatures | | Catalyst Moisture Content Per Cent by Wgt. of Catalyst | | Rate of Heating Temp. Increase, °F. per Min. | Catalyst Broken and Cracked during Heating Per Cent of Original |
| --- | --- | --- | --- | --- | --- |
| Initial, °F. | After Heating, °F. | Initial | After Heating | | |
| 250 | 600 | 12 | 2.9 | 7.1 | 0 |
| 250 | 600 | 12 | 2.9 | 26.7 | 0 |
| 250 | 600 | 12 | 2.9 | 53.4 | 0 |
| 250 | 600 | 12 | 2.9 | 70.0 | 65 |
| 250 | 600 | 12 | 2.9 | 115 | 50 |
| 250 | 600 | 12 | 2.9 | above 500 | 100 |

Table I shows that when a gel type catalyst of this type exists at a temperature of the order of 250° F. it will contain about 12% by weight moisture which is reduced to about 2.9% moisture on heating to 600° F. When the catalyst was heated from 250° F. to 600° F. at a rate of 53.4° F. per minute and at any lower rate no cracking and breakage of the catalyst particles occurred. When the rate of heating was 70° F. per minute about 65% of the catalyst particles were cracked and broken. The amount of moisture removed between 250° F. and 600° F. in this case may be considered the loosely bound moisture referred to hereinabove.

In Table II there is shown data on heating the same catalyst at various rates, starting at an initial temperature of 80° F.

*Table II*

| Catalyst Temperature | | Catalyst Moisture Content Per Cent by Wgt. of Catalyst | | Rate of Heating, °F. per Min. | Catalyst Broken and Cracked during Heating Per Cent of Original |
|---|---|---|---|---|---|
| Initial, °F. | After Heating, °F. | Initial | After Heating | | |
| 80 | 600 | 12 | 2.9 | 3.0 | 0 |
| 80 | 600 | 12 | 2.9 | 16.0 | 30 |
| 80 | 600 | 12 | 2.9 | 32.0 | 60 |
| 80 | 600 | 12 | 2.9 | above 500 | 100 |

It will be noted that when this catalyst was heated from 80° F. to 600° F. the permissible rate of heating (3° F./minute maximum) is much lower than in the case of catalyst initially existing at 250° F. While the reason for this is not fully understood, it is clear that it is not because of any difference in initial moisture content as comparison of the data in Tables I and II clearly show. For true gel catalysts we prefer to conduct the initial heating period at rates of the order of 75° F. to 150° F. increase per hour but within the broader scope of this invention we contemplate heating catalysts at a rate up to about 60° F. per minute during the initial heating period.

In Table III there is shown data on the amount of moisture which should be removed and the corresponding temperature before the catalyst may be heated rapidly. This data was obtained on a catalyst similar to that involved in Tables I and II.

*Table III*

| Catalyst Temperature | | Catalyst Moisture Content Per Cent by Wgt. of Catalyst | | Rate of Heating, °F. per Min. | Catalyst Broken and Cracked during Heating Per Cent of Original |
|---|---|---|---|---|---|
| Initial, °F. | After Heating, °F. | Initial | After Heating | | |
| 400 | 1,050 | 4.5 | 0.0 | above 500 | 100 |
| 500 | 1,050 | 3.8 | 0.0 | above 500 | 30 |
| 600 | 1,050 | 2.9 | 0.0 | above 500 | 0 |

It will be seen from Table III that for a gel catalyst of this type the loosely bound moisture which would cause breakage of the catalyst particles on rapid heating is not substantially completely removed until a temperature approaching about 600° F. is reached. The residual 2.9% moisture on the catalyst at 600° F. may be considered as tightly bound moisture which is not released at a fast enough rate to cause catalyst particle breakage even on very rapid heating of the catalyst. The moisture content data given in Tables I–III inclusive is on the basis of an assumed bone dry catalyst at 1050° F. Actually the catalyst at 1050° F. may contain in a small amount of tightly bound moisture. The catalyst involved in the data of Tables I–III consisted of spheres of about .14 inch average diameter prepared by mixing of a basic solution of sodium silicate with an acidic solution of aluminum sulfate in a ratio to give about .13 parts by weight silica to 1 part by weight of alumina. It will be understood that the maximum required temperature to which the catalyst must be slowly heated before it may be very rapidly heated on up to the desired heat treating temperature will vary somewhat from that shown in Table III depending upon the particular catalyst involved. In general this critical temperature will be within the range about 500° F.–700° F. for true gel catalysts and within the range about 300–700° F. for catalysts of other types which are susceptible to being cracked and broken by rapid initial heating.

The method of mixing the preheated gas supplied to balance temperature loss from the system, with the gas from the cooling zone in the absence of the solid material is of considerable importance. Unless such a gas mixing chamber is provided, the two converging gas streams which may be at substantially different temperatures will not be uniformly mixed, and uneven temperatures across the column of solid material in the heat treating zone will result. The structure shown for providing a gas mixing chamber and the structure for uniformly introducing mixed gas into the heat treating zone are believed to be novel and are part of the preferred form of this invention. The invention in its broader scope is intended also to cover certain modified structures which may be adapted to accomplish the same purpose although less satisfactorily.

The construction shown for gas distribution pipes 50 is also part of the preferred form of this invention. The provision of baffle plates 49, as shown, prevents the channeling of gas through the gas spaces directly under the pipes 50 to localized areas of the cooling zone cross-section and thereby promotes even distribution of cooling gas across the entire cooling zone cross-section and uniform cooling of the solid material. The holes 48 in the pipes 50 should be of such size as to cause a pressure drop due to gas flow therethrough high enough to insure substantially equal discharge of gas through each hole. The combined provision of cooling gas distribution, as shown, and uniformly spaced conduits 24 for confined passage of solid material through the gas mixing chamber between heat treating and cooling zones serves to substantially eliminate any tendency for channeling of gas and solid material flow through certain localized areas of the vessel cross-section which channeling might otherwise arise first in the cooling section and extend upwardly through the heat treating zone. Such channeling would result in considerable lack of uniformity in the heat treatment of the solid material. It has been found generally preferable and satisfactory to limit the length of the cooling zone 25 below about 3 feet. Broadly the ratio of the length of the cooling zone to its diameter should preferably be of the order of 25% to 35%.

The gas introduced into the cooling zone through pipes 50 and into the mixing zone through pipes 30 may be inert gas of substantially the same type as shown hereinabove, or the manifolding may be altered to permit introduction of different gases at the two levels. Thus flue gas instead of air would be introduced through pipes 30. Moreover, if desired, the apparatus may be modified to permit external mixing of the gases.

It is common practice in operations involving heat treatment of solid adsorbent materials to contact said solid materials with controlled partial pressures of steam under the heat treating temperature conditions. Such steam contact greatly accelerates the heat treating operation. In the apparatus shown, controlled quantities of steam may be admitted through pipe 34 into the line burner 32 and conducted along with the preheated inert gas entering through conduit 39, through the line heater and manifold 31 into the mixing chamber 33 through pipes 30. The amount of steam thus admitted should be such that the gas flowing upwardly through the heat treating zone contains from 1% to 50% by volume steam, depending upon the solid adsorbent being treated and the desired severity of the treatment.

It should be noted that the term inert gas as used herein in describing and claiming this invention is used in the sense of a gas which is substantially chemically inactive with relation to the solid material being treated.

The above described continuous method for treating solids as a column moving through three zones in series is an example of a specific preferred adaptation of the broad concept of this invention for a specific operation. This preferred adaptation is the subject of method and apparatus claims in copending application Serial Number 732,305 filed in the United States Patent Office on March 4, 1947. It should be understood that in its broader aspects this invention is not limited to the particular continuous type method described hereinabove. It is contemplated that in its broadest aspects this invention covers batch-wise methods of operation in which the complete treating operation may be conducted intermittently in one or in more than one vessels. For example, in a single vessel, the solid material may be first heated at the above discussed controlled slow rate up to the temperature where loosely bound moisture is substantially completely removed, then in the same vessel the solid may be heated at a faster rate until a heat treating temperature is reached at which it is maintained for the desired period while passing suitable treating gas therethrough. Then the solid may be cooled while still in the same vessel. It is contemplated that in the broadest scope of this invention the heating and cooling operations may be accomplished in other ways than as described hereinabove as long as the above discussed initial slow rate of heating is properly observed. It is further emphasized that in its broadest aspect this invention is not limited to a process for heat treating solids in presence of steam containing gas but the invention herein described presents an important new method for heating to elevated temperatures moisture bearing adsorbents which are susceptible to cracking and/or breakage on heating.

As an example of the application of this invention, the preferred form substantially as shown in Figure 1 is now used commercially for the heat treatment of gel type bead catalysts used for a catalytic hydrocarbon conversion process. The bead catalyst is prepared by nozzle mixing a basic solution of sodium silicate with an acidic solution of aluminum sulfate in the ratio to give about 13 parts by weight of silica to 1 part by weight of alumina. The resulting sol stream is broken up and dropped through a column of oil in such a manner as to form sol spheres which gel during passage through the oil column. The spherical gel beads are hot water treated, base exchanged with aluminum sulfate, washed and then dried in a continuous belt type drying oven while being contacted with superheated steam at a temperature of about 300° F. The dried beads pass from the driers at about 300° F. and still contain about 5% to 15% by weight moisture. The bead catalyst is introduced directly without cooling into a heat treating apparatus of the type shown in Figure 1. It is subjected to preheating by indirect heat transfer at the rate of about 100° F. per hour. The catalyst leaving the indirect heat transfer preheating zone is at a temperature of about 550° F. It is then rapidly heated by direct contact with the heat treating gas in the upper section of the heat treating zone to a temperature of about 1300° F. and maintained near said temperature throughout a major portion of the heat treating zone.

The treated catalyst then passes through the cooling zone wherein it is cooled to about 400° F. by direct contact with a stream of air introduced at atmospheric pressure. The cooled catalyst flows from the apparatus at a rate throttled so as to control its residence time in the heat treating zone to about 10 hours. A second stream of air preheated to about 1525° F. is introduced into the air mixing chamber and the mixed air passes upwardly through the heat treating zone. A controlled amount of steam is introduced along with the preheated air so that the gas passing through the heat treating zone consists of about 10% volume steam. The volumetric ratio of preheated air introduced to the mixing chamber to atmospheric air introduced to the cooling zone is of the order of 5 to 4. The heat treating gas passes from the top of the apparatus at about 400° F. after indirect heat exchange with the solid material in the preheating zone. The total gas throughput amounts to about 20 cubic feet (standard) per pound of catalyst treated, which gas is passed through the apparatus at a pressure drop of about 30 inches of water. From the above example it will be apparent that the method and apparatus of this invention provides a heat treating process of very high thermal efficiency and having a very low operating cost. All previous attempts to heat treat the bead catalyst in conventional apparatus were totally unsuccessful due to the loss of about 50% of the catalyst due to breakage or cracking. By the method and apparatus described hereinabove, only about 5% loss of beads was encountered.

It will be understood that the specific form of apparatus and the specific operation conditions presented in the description of this invention are merely exemplary and are in no way intended to

I claim:

1. A method for heat treating particle form gel type solid adsorbent materials at controlled elevated temperatures without substantial cracking of the solid particles which comprises the steps: heating said solid material by indirect heat transfer to a temperature sufficiently high to insure substantially complete moisture removal and of the order of about 500° F. to 700° F. at a rate of about 75° F. to 150° F. per hour, further heating said solid material to a predetermined heat treating temperature within the range 1000° F. to 1600° F. at a substantially higher rate, maintaining said solid material near said predetermined heat treating temperature while subjecting it to contact with a steam containing gas for a period of about 2 to 20 hours and cooling said heat treated solid material by direct contact with a suitable cooling gas which is substantially chemically inactive with relation to the solid material.

2. A method for heat treating gel type, bead form, solid catalytic materials at controlled elevated temperatures which method comprises: increasing the temperature of said bead catalyst to about 500° F. to 600° F. at a rate within the range 75° F. to 150° F. increase per hour, further heating said bead catalyst to a predetermined heat treating temperature of about 1300° F. at a considerably higher rate of increase, maintaining said bead catalyst near said predetermined heat treating temperature for a period of 10 hours, and finally cooling said heat treated bead catalyst.

3. A method for heat treating at controlled elevated temperatures particle form solid adsorbent materials existing initially at a temperature of at least about 250° F. without substantial cracking and breakage of the solid particle which method comprises the steps: heating said solid particles to a temperature within the range about 300° F. to 700° F. from a temperature below that range but at least of about 250° F. at a controlled rate below about 60 F. temperature increase per minute, further heating said solid material to a predetermined suitable heat treating temperature above about 1000° F. at a substantially higher rate of temperature increase, maintaining said contact material near said suitable heat treating temperature for an extended period and cooling the heat treated contact material.

4. A method for heating to elevated temperatures particle form gel type adsorbents existing near atmospheric temperature without cracking the adsorbent particle which comprises: increasing the adsorbent temperature at a rate within the range about 75° F. to 150° F. per hour temperature increase at least until a temperature of about 600° F. is reached.

5. A method for heating to elevated temperatures above about 700° F. particle form solid gel type adsorbents existing at temperatures above about 250° F. without substantial cracking of the gel particles which comprises: heating the solid particles at a rate below about 60° F. temperature increase per minute at least until a temperature is reached at which the loosely bound moisture is substantially completely removed, which temperature is within the range about 500° F. to 700° F.

6. A method for heat treating particle form gel type solid adsorbent materials at elevated temperatures without substantial cracking and breaking of the solid particles which comprises the steps: heating said solid material from an initial temperature of at least 250° F. at a rate below about 60° F. temperature increase per minute until a temperature is reached at which the loosely bound moisture is substantially completely removed, said temperature being within the range about 500° F. to 700° F., further heating said solid material to a predetermined heat treating temperature within the range about 1000° F. to 1600° F., and maintaining said solid material within a narrow range of heat treating temperature while contacting it with a steam containing gas for a period of about 2 to 20 hours.

7. A method for heat treating particle form solid adsorbent materials at controlled elevated temperatures without substantial breakage of the solid particles which method comprises the steps of heating said solid material below a critical maximum rate which would cause substantial cracking or breaking of the solid particles, which maximum rate depends upon the initial adsorbent material temperature and decreases with decreasing initial temperature and is less than about 3° F. increase per minute and less than about 60° F. increase per minute for initial contact material temperatures of the order of atmospheric temperature and 250° F. respectively, until a temperature is reached at which substantially all the loosely bound moisture is substantially completely removed, said latter temperature being within the range about 300° F. to 700° F.; further heating said solid material to a heat treating temperature above about 1000° F. at a substantially higher rate of heating, and after effecting heat treatment of said solid material cooling the same.

8. A method for heat treating particle form gel type solid adsorbent materials at controlled elevated temperatures without substantial cracking of the solid particles which comprises the steps: heating said solid material by indirect heat transfer to a temperature sufficiently high to insure substantially complete moisture removal and of the order of about 500° F. to 700° F. at a rate which is limited below a maximum rate which would cause substantial cracking of said particles, said maximum rate being dependent upon the initial temperature of said solid material, being greater the higher the initial solid material temperature and being less than about 3° F. increase per minute and less than about 60° F. for initial contact material temperatures of the order of 80° F. and 250° F. respectively, further heating said solid material to a predetermined heat treating temperature within the range 1000° F. to 1600° F. at a substantially higher rate, maintaining said solid material near said predetermined heat treating temperature while subjecting it to contact with a steam containing gas for a period of about 2 to 20 hours and cooling said heat treated solid material by direct contact with a cooling gas which is substantially inert with respect to said solid material.

9. A method for heating to elevated temperatures moisture containing particle form adsorbent materials which are susceptible to cracking and breakage on heating which comprises: increasing the temperature of the adsorbent material at a rate which is below a maximum critical rate at which substantial cracking and breakage of the particles would occur, said maximum critical rate being different for different initial adsorbent material temperatures and being higher, the higher the initial temperatures and being less than about 3° F. increase per minute and less than 60° F. increase per minute for initial adsorbent material temperatures of the order of atmospheric temperature and 250° F. respectively, until a temperature sufficiently high to insure substantially complete removal of loosely bound moisture is reached, said last named temperature being within the range of about 300° F. to 700° F.

10. A method for heating to elevated temperatures moisture containing particle-form gel type solid adsorbent materials without substantial breakage or cracking of the particles which comprises: increasing the temperature of the solid material to a temperature at which the loosely bound moisture is substantially completely removed, said temperature being within the range about 500° F. to 700° F. and controlling the rate of said heating below a maximum rate at which the particles of adsorbent would be broken and cracked, which maximum rate depends upon the adsorbent initial temperature, being greater the higher the initial temperature of the adsorbent and being less than about 3° F. per minute increase for an initial adsorbent temperature of about 80° F. and less than about 60° F. for an initial adsorbent temperature of about 250° F.

11. A method for heating moisture containing particle form adsorbents which are susceptible to cracking and breakage on heating from an approximately atmospheric initial temperature to a temperature at which the loosely bound moisture is substantially released from the adsorbent which method comprises: heating the adsorbent material from substantially atmospheric temperature to a temperature within the range about 300° F. to 700° F. at which substantially all of the loosely bound moisture is removed at a heating rate of less than about 3° F. increase in temperature per minute; whereby substantial cracking and breakage of said adsorbent during the heating is avoided.

12. A method for heat treating particle form solid contact mass materials at controlled elevated temperatures without substantial cracking of the solid particles which method comprises: passing said solid material through a series of three superposed zones, subjecting said solid material passing through said first zone to indirect heat transfer relationship with hot heat treating gas from said second zone in such a way as to increase the temperature of said solid material to a level within the range about 300° F. to 700° F. at a rate of increase which is below the maximum rate at which said solid material particles would be substantially cracked, the maximum rate being dependent upon the initial solid material temperature, being higher for higher initial temperatures and being below about 3° F. per minute increase and about 60° F. per minute increase for initial solid material temperatures of the order of atmospheric temperature and 250° F. respectively, subjecting said solid material passing through said second zone to direct contact with preheated heat treating gas to further heat and to maintain said solid material near a set heat treating temperature within the range 1000° F. to 1600° F. while accomplishing the heat treating of said solid material, subjecting said heat treated solid material passing through said third zone to direct contact with a low temperature gas which constitutes at least part of the heat treating gas used thereafter in said heat treating zone so as to cool said solid material while preheating said gas.

13. The method of claim 12 wherein said heat treating gas used within said heat treating zone contains a percentage of steam within the range of 1% to 50%.

14. A method for heat treating particle form solid contact mass materials at controlled elevated temperatures without substantial breakage thereof which method comprises: passing said solid material through a series of three superposed zones in the first of which it is preheated to a set preheat temperature within the range about 300° F. to 700° F. which is sufficient for substantially complete moisture removal, in the second of which it is further preheated to a predetermined heat treating temperature level which is above about 1000° F. and is suitable for the heat treatment of said solid material and maintained near said heat treating temperature for a prolonged period, and in the third of which it is cooled from said heat treating temperature to a set outlet temperature; introducing a low temperature gas which is substantially inert with respect to the solid material into said third zone and passing it therethrough in direct contact with said solid material, the rate of introduction of said gas being substantially that required to cool said solid material to said set outlet temperature and to substantially heat said gas, passing said heated gas through said second zone in direct contact with said solid material, introducing a gas preheated to a temperature above said predetermined heat treating temperature to said second zone and passing it therethrough along with said gas from said third zone to adjust the temperature of the solid material entering said second zone and to maintain said solid material near said heat treating temperature, said preheated gas being an inert gas containing a sufficient amount of steam to provide a steam percentage in the combined gas passing through said second zone within the range 1–50 percent by volume, and passing the mixed hot gas issuing from said second zone in such indirect heat transfer relationship with the solid material in said first zone as to slowly heat said solid material to said set preheat temperature.

15. A method for heat treating a particle form solid gel type bead catalyst at controlled elevated temperatures which comprises: passing said catalyst serially through three superposed, communicating zones, the catalyst flow through each zone being such as to fill the flow passages in said zone with a substantially compact mass of downwardly moving solid particles, introducing cool gas which is substantially chemically inactive with respect to the solid material into the lowermost zone and passing it through the catalyst so as to substantially cool the heat treated catalyst and so as to substantially heat said gas, uniformly mixing said gas issuing from said lowermost zone with a second stream of gas externally preheated to a temperature substantially above a predetermined heat treating temperature within the range about 1000–1600° F., passing the mixed gas streams through the intermediate zone in direct contact with said catalyst so as to maintain said catalyst near said predetermined suitable heat treating temperature throughout a major portion of said intermediate zone and to adjust the temperature of the catalyst entering said zone from a set inlet temperature to about said heat treating temperature, passing the hot mixed heat treating gas issuing from said intermediate zone in controlled indirect heat transfer relationship with the catalyst in said uppermost zone, the relationship being so controlled as to provide preheating of the catalyst at a rate within the range 75° F. to 150° F. per hour to said set inlet temperature to said intermediate zone, said set inlet temperature being within the range about 500° F. to 700° F.

16. A method for heat treating particle form solid contact mass materials without substantial cracking of the solid particles which method comprises: subjecting said solid material to indirect heat transfer relationship with a hot heat treating gas from the hereinafter stated heat treating step, to increase the temperature thereof to a level within the range about 300° F. to 700° F. which is sufficiently high to insure substantially complete removal of moisture at a controlled rate of increase below a critical rate which would cause substantial cracking of the particles, said critical rate being dependent upon the initial temperature of the solid material, being higher for higher initial temperatures and being below about 3° F. per minute increase and about 60° F. per minute increase for initial solid material temperatures of the order of 80° F. and 250° F. respectively, further heating said solid material by direct contact with said heat treating gas to a suitable heat treating temperature level above about 1000° F., maintaining said solid material at said heat treating temperature level for a substantial period of time sufficient to accomplish the heat treatment thereof and cooling said heat treated solid material by direct contact with at least part of said heat treating gas before use of said gas in said heat treating step thereby also accomplishing the preheating of said gas for use in said heat treating step.

JOHN W. PAYNE.

REFERENCES CITED

The following references are of record in the file of this patent:

UNITED STATES PATENTS

| Number | Name | Date |
|---|---|---|
| Re. 22,196 | Heard | Oct. 6, 1930 |
| 1,775,640 | Griessbach et al. | Sept. 16, 1930 |
| 1,900,859 | Connolly et al. | Mar. 7, 1933 |
| 2,112,643 | Baensch et al. | Mar. 29, 1938 |
| 2,353,552 | Drennan | July 11, 1944 |